United States Patent [19]

Suzuki

[11] Patent Number: 5,481,591
[45] Date of Patent: Jan. 2, 1996

[54] PRIVATE BRANCH RADIO EXTENSION TERMINATING SYSTEM

[75] Inventor: Toshiki Suzuki, Tokyo, Japan

[73] Assignee: NEC Corporation, Japan

[21] Appl. No.: 195,347

[22] Filed: Feb. 10, 1994

[30] Foreign Application Priority Data

Feb. 17, 1993 [JP] Japan .................................. 5-027057

[51] Int. Cl.⁶ .............................. H04Q 7/20; H04Q 7/22; H04Q 7/26
[52] U.S. Cl. .............................. 379/58; 379/59; 455/33.1
[58] Field of Search .................................. 379/58, 59, 60, 379/61, 63; 342/357; 455/33.1

[56] References Cited

U.S. PATENT DOCUMENTS

| | | | |
|---|---|---|---|
| 4,833,702 | 5/1989 | Shitara et al. | 379/60 |
| 5,090,051 | 2/1992 | Muppidi et al. | 379/61 |
| 5,235,633 | 8/1993 | Dennison et al. | 342/357 |

Primary Examiner—Curtis Kuntz
Assistant Examiner—Michael B. Chernoff
Attorney, Agent, or Firm—Ostrolenk, Faber, Gerb & Soffen

[57] ABSTRACT

A private branch radio extension terminating system includes radio base station units, at least one line control unit, and a central processing unit. The radio base station units are installed in a plurality of places each capable of accommodating a plurality of private branch radio extension terminals within its radio wave range. The line control unit controls the radio base station units. The private electronic branch exchange includes a time-division switch for accommodating the line control unit, a central processing unit for controlling the private branch radio extension terminals via the line control unit and the base station units, and a storage unit for storing various data and programs. The central processing unit determines the radio base station unit, which is to transmit a ringing signal for calling the private branch radio extension terminal, on the basis of position registration information and route information about the private branch radio extension terminal, and transmits a ringing signal transmission command to the radio base station unit.

4 Claims, 4 Drawing Sheets

FIG. 2A

| TERMINAL NUMBER | RADIO WAVE RANGE NUMBER | |
|---|---|---|
| | NOW | OLD |
| 11 | 18 | 17 |
| 12 | 18 | 19 |
| 13 | 20 | 19 |
| 14 | 19 | 20 |
| 15 | 17 | 16 |
| . | . | . |
| . | . | . |
| | | |

FIG. 2B

| 18 : RADIO WAVE RANGE NUMBER | |
|---|---|
| FROM | TO |
| 17 | 19 |
| . | . |
| . | . |

FIG. 3A

| TERMINAL NUMBER | RADIO WAVE RANGE NUMBER ||
|---|---|---|
| | NOW | OLD |
| 11 | 19 | 18 |
| 12 | 18 | 19 |
| 13 | 20 | 19 |
| 14 | 19 | 20 |
| 15 | 17 | 16 |
| . | . | . |
| . | . | . |

FIG. 3B

| TERMINAL NUMBER | RADIO WAVE RANGE NUMBER ||
|---|---|---|
| | NOW | OLD |
| 11 | 20 | 19 |
| 12 | 18 | 19 |
| 13 | 20 | 19 |
| 14 | 19 | 20 |
| 15 | 17 | 16 |
| . | . | . |

FIG. 3C

| 19 : RADIO WAVE RANGE NUMBER ||
|---|---|
| FROM | TO |
| 18 | 20 |
| . | . |
| . | . |

FIG. 4A

| TERMINAL NUMBER | RADIO WAVE RANGE NUMBER ||
| --- | --- | --- |
| | NOW | OLD |
| 11 | 17 | 16 |
| 12 | 18 | 19 |
| 13 | 20 | 19 |
| 14 | 19 | 20 |
| 15 | 17 | 16 |
| . | . | . |
| . | . | . |

FIG. 4B

| 17 : RADIO WAVE RANGE NUMBER ||
| --- | --- |
| FROM | TO |
| 18 | 16 |
| . | . |

FIG. 4C

| 17 : RADIO WAVE RANGE NUMBER ||
| --- | --- |
| FROM | TO |
| 18 | 16 |
| 16 | 18 |
| . | . |

PRIVATE BRANCH RADIO EXTENSION TERMINATING SYSTEM

BACKGROUND OF THE INVENTION

1. Field of the Invention

The present invention relates to a private branch radio extension terminating system for determining a radio base station unit, which transmits a ringing signal, on the basis of moving route information about a private branch radio extension terminal.

2. Description of the Relevant Art

In conventional terminating methods, when a ringing signal is to be transmitted to a private branch radio extension terminal, a private electronic branch exchange causes all radio base station units to simultaneously transmit ringing signals, or causes one radio base station unit determined from position registration information to transmit a ringing signal.

In the former method of simultaneously transmitting ringing signals from all the radio base station units, the control information traffic between a central processing unit, line control units, and radio base station units increases, and the radio interval traffic between radio base station units and private branch radio extension terminals increases. As a result, the call processing count with respect to private branch radio extension terminals per unit time inevitably decreases.

In the latter method of transmitting a ringing signal from one radio base station unit, failure in terminating processing may occur depending on the relationship between the radio wave range, of the base station unit, in which the private branch radio extension terminal is located and the radio wave range of an adjacent radio base station unit.

SUMMARY OF THE INVENTION

The present invention has been made in consideration of the above situation, and has as its object to provide a private branch radio extension terminating system which selects an optimal radio base station unit for transmitting a ringing signal to a private branch radio extension terminal on the basis of moving route information and position registration information about the terminal so as to reduce the amount of information for terminating processing with respect to the terminal both in a private electronic branch exchange and a radio interval, thereby increasing the terminating processing count per unit time.

In order to achieve the above object, according to the main aspect of the present invention, there is provided a private branch radio extension terminating system comprising radio base station units in a plurality of places each capable of accommodating a plurality of private branch radio extension terminals within a radio wave range, at least one line control unit for controlling the radio base station units, and a private electronic branch exchange including a time-division switch for accommodating the line control unit, a central processing unit for controlling the private branch radio extension terminals via the line control unit and the base station units, and a storage unit for storing various data and programs, wherein the central processing unit determines the radio base station unit, which is to transmit a ringing signal for calling the private branch radio extension terminal, on the basis of position registration information and route information about the private branch radio extension terminal, and transmits a ringing signal transmission command to the radio base station unit.

The central processing unit in the main aspect is characterized in that when the private branch radio extension terminal moves, the central processing unit updates the position registration information and the route information about the private branch radio extension terminal by using registered information from the private branch radio extension terminal.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIGS. 2A and 2B are tables each showing an example of the format of an information table stored in a storage unit in FIG. 1;

FIGS. 3A to 3C are tables for explaining the first method of generating route information tables; and FIGS. 4A to 4C are tables for explaining the second method of generating route information tables.

DETAILED DESCRIPTION OF THE PREFERRED EMBODIMENT

Figure 1:
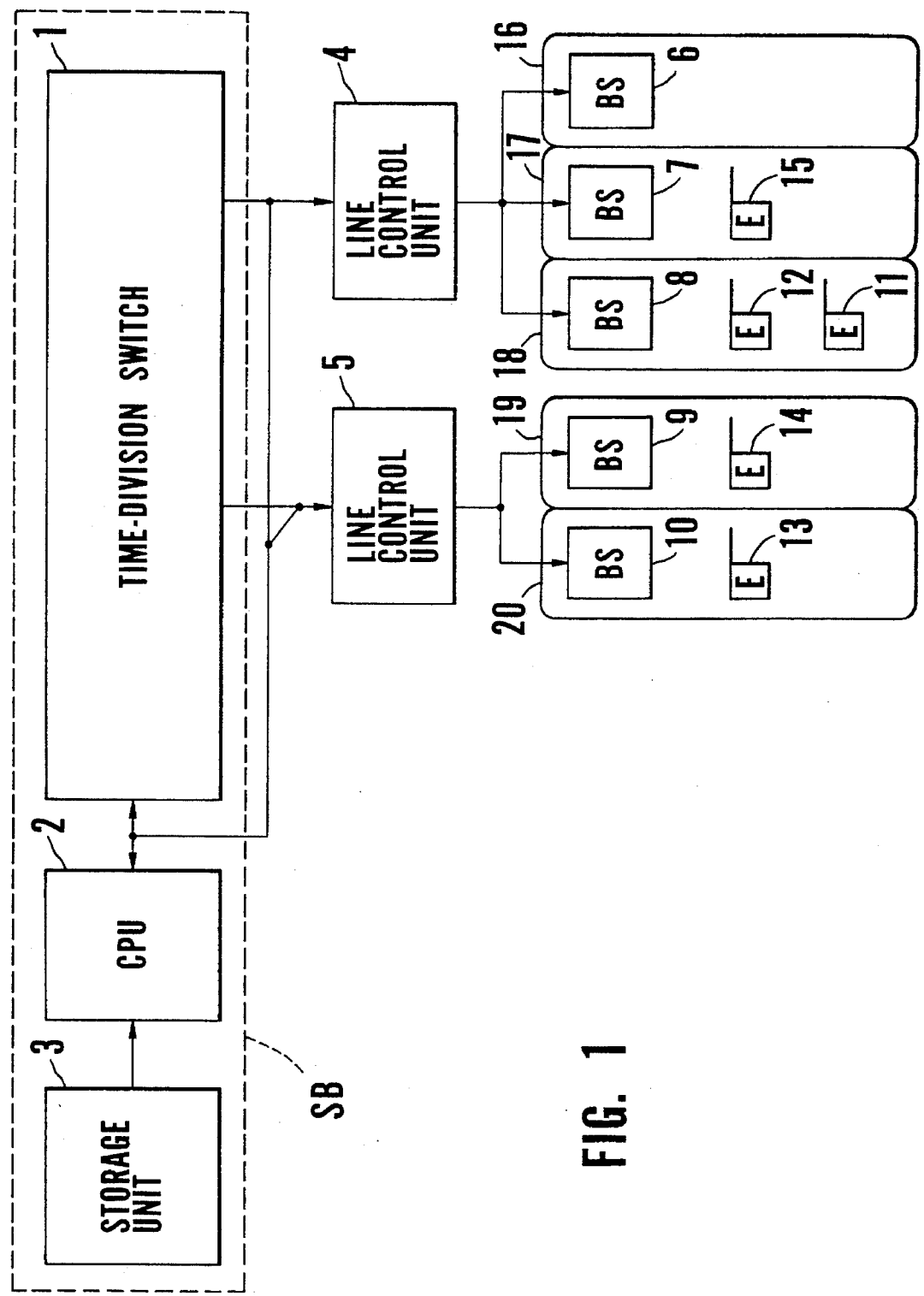
FIG. 1 is a block diagram schematically showing the overall arrangement of an embodiment of the present invention.

An embodiment of the present invention will be described below with reference to the accompanying drawings.

Referring to FIG. 1, which is a block diagram showing a system of an embodiment of the present invention, the system of the embodiment includes a private electronic branch switchboard (exchange) SB, line control units 4 and 5 connected thereto, and radio base station units (BSs) in a plurality of places each capable of accommodating a plurality of private branch radio extension terminals (ES) within its radio wave range. The private electronic branch switchboard SB is constituted by a time-division switch 1 and a processing control unit (CPU) 2 for performing centralized control in the private electronic branch switchboard SB in accordance with information and programs stored in a storage unit 3. The storage unit 3 includes a position registration information table and a route information table.

If it is possible, at least one line control unit need only be used.

Referring to FIG. 1, BSs 6, 7, 8, 9, and 10 are installed in radio wave ranges 16, 17, 18, 19, and 20, respectively. The line control unit 4 controls the BSs 6, 7, and 8, whereas the line control unit 5 controls the BSs 9 and 10. An E 15 is present in the radio wave range 17. Es 11 and 12 are present in the radio wave range 18. An E 14 is present in the radio wave range 19. An E 13 is present in the radio wave range 20.

FIGS. 2A and 2B are tables each showing an example of the format of an information table stored in the storage unit 3. The position registration information table shown in FIG. 2A is constituted by radio wave range numbers corresponding to registration positions for the respective terminal numbers of private branch radio extension terminals. The route information table shown in FIG. 2B comprises original radio wave range numbers indicating radio wave ranges from which private branch radio extension terminals have moved, and current radio wave range numbers corresponding to radio wave ranges to which the private branch radio extension terminals move, which radio wave range numbers are written for each radio wave range number.

Referring to FIG. 2A, as described above, if the E 15 is present in the radio wave range 17 of the BS 7; the Es 11 and 12, in the radio wave range 18 of the BS 8; the E 14, in the radio wave range 19 of the BS 9; and the E 13, in the radio wave range 20 of the BS 10 at present (NOW), radio wave range numbers as position registration information of "NOW" and radio wave range numbers before movement of the respective Es (OLD) are registered in the position registration information table in correspondence with the terminal numbers of the Es.

Referring to FIG. 2B, radio wave range number "17" of the original position (FROM) of a private branch radio extension terminal which moves into the radio wave range 18 and radio wave range number "19" of the current position (TO) are written in the route information table.

If an incoming call with respect to the E11 is received in this state, the central processing unit 2 refers to the position registration information table in the storage unit 3 to read out information indicating that the E 11 has moved from the radio wave range 17 of "OLD" and has performed position registration in the radio wave range 18 of "NOW".

Subsequently, the central processing unit 2 refers to the route information table ( FIG. 2B ) corresponding to the radio wave range 18 of "NOW" to read out radio wave range number "19" of "TO" from radio wave range number "17" of "FROM" corresponding to radio wave range number "17" of "OLD" previously read out from the position registration information table. With this information, the central processing unit 2 recognizes that the E 11, which moved from the radio wave range 17 into the radio wave range 18 in the past, has moved into the radio wave range 19.

As a result of this recognition, the central processing unit 2 determines, from the position registration information table and the route information table, that radio wave range numbers "18" (NOW) and "19" (TO) are the numbers of the radio wave ranges to which ringing signals are to be transmitted to call the E 11, and ringing signal transmission commands are to be transmitted to the BSs 8 and 9.

The central processing unit 2, therefore, transmits ringing signal transmission commands to the BSs 8 and 9 via the line control units 4 and 5, respectively. When the E 11 receives ringing signals from the BSs 8 and 9, it recognizes the reception of the incoming call.

The first and second methods in which the central processing unit 2 generates route information tables in the storage unit 3 will be described next.

FIGS. 3A to 3C are tables for explaining the first method of generating route information tables. FIGS. 3A and 3B respectively show position registration information tables generated before and after update processing. FIG. 3C shows a route information table.

The position registration information table in FIG. 3A indicates, for example, that the E 11 has moved from the radio wave range 18 and is now located in the radio wave range 19. When the E 11 subsequently moves into the radio wave range 20, the position registration information about the E 11 is updated by the central processing unit 2, as indicated by the position registration information table shown in FIG. 3B, that is, the radio wave range number of "OLD" is updated to "19"; and the radio wave range number of "NOW", "20".

The central processing unit 2 writes radio wave range number "18" of "OLD" of the position registration information table shown in FIG. 3A, as route information corresponding to radio wave range number "19" of "OLD" of the position registration information table shown in FIG. 3B, in "FROM" of the route information table shown in FIG. 3C. In addition, the central processing unit 2 writes radio wave range number "20" of "NOW" of the position registration information table shown in FIG. 3B in "TO" of the route information table. With this operation, route information is generated at the same time when the position of the E 11 is registered.

FIGS. 4A to 4C are tables for explaining the second method of generating route information tables. FIG. 4A shows a position registration information table. FIGS. 4B and 4C respectively show route information tables.

The position registration information table in FIG. 4A indicates, for example, that the E 11 has moved from the radio wave range 16 and is now located in the radio wave range 17.

When an incoming call with respect to the E 11 is received in this state, the central processing unit 2 refers to the route information table in FIG. 4B corresponding to radio wave range number "17" of "NOW" of the position registration information table to read out a radio wave range number of "TO" from a radio wave range number of "FROM" corresponding to radio wave range number "16" of "OLD" of the position registration information table. However, since this route information is not registered in the route information table in FIG. 4B, the central processing unit 2 causes the BS 6 to transmit a ringing call only within the radio wave range 16 corresponding to radio wave range number "16" of "OLD" of the position registration information table.

In this case, if the E 11 cannot be called within a predetermined period of time, the central control unit 2 transmits ringing signal transmission commands to all the BSs via the line control units 4 and 5, which technique is one of the conventional private branch radio extension terminal calling schemes.

Upon detecting, from the BS 8 via the line control unit 4, that the E 11 has received an incoming call in the radio wave range 18, the central processing unit 2 writes radio wave range number "16" of "OLD" of the position registration information table in "FROM" of the route information table in FIG. 4C, and also writes radio wave range number "18", in which reception of the incoming call is confirmed, in "TO" of the corresponding radio wave range number.

Note that if there are pieces of information of "OLD" corresponding to "FROM" of a route information table, the above-described operation can be performed for each terminal number of the position registration information table.

As has been described above, according to the present invention, when a private branch radio extension terminal is to be called, ringing signals are transmitted from only an optimal radio base station for a calling operation, which is determined by using prediction data for predicting a radio wave range to which the terminal will move, as route information, thereby achieving a reduction in control traffic between the central processing unit and the radio base station units while decreasing the probability of terminating failure due to the relationship with adjacent radio wave ranges. Therefore, the radio interval traffic between the radio base station units and the private branch radio extension terminals also decreases to increase the terminating processing count with respect to private radio extension terminals per unit time.

In addition, since a position registration information table and a route information table are generated in correspondence with each other a maintenance person need not register special data in the private electronic branch exchange, in consideration of isolation, within a building which cannot be covered by two-dimensional radio area control for, e.g., a vehicle telephone. Therefore, private branch radio extension terminals can be efficiently called with the lapse of time.

What is claimed is:

1. A private branch radio extension terminating system comprising: a plurality of radio base station units each capable of accommodating a plurality of private branch radio extension terminals within a radio wave rage, at least one line control unit for controlling said radio base units, and a private electronic branch exchange including a time-division switch for accommodating said line control unit, a central processing unit for controlling said private branch radio extension terminals via said line control unit and said base station units, and a storage unit for storing various data and programs;

wherein said central processing unit determines which of said radio base station units is to transmit a ringing signal for calling a selected private branch radio extension terminal, on the basis of position registration information and route information about said private branch radio extension terminal stored in said storage unit, and transmits a ringing signal transmission command to each said determined radio base station unit; and wherein when said private branch radio extension terminal moves, said central processing unit updates the position registration information and the route information about said private branch radio extension terminal by using registered information from said private branch radio extension terminal.

2. A system according to claim 1, wherein said system services a plurality of radio wave range areas, each of which is designated by a radio wave range number, and said position registration information includes the radio wave range number where a private branch radio extension terminal is presently located and the radio wave range number where a private branch radio extension terminal was previously located.

3. A system according to claim 1, wherein said system services a plurality of radio wave range areas, each of which is designated by a radio wave range number, and said route information indicates for a specific radio wave range number the radio wave range number of a private branch radio extension terminal prior to its entering the area of the specific radio wave range number, and the radio wave range number indicating the area to which the same private branch radio extension terminal moved after it left the area of the specific radio wave range number.

4. A system according to claim 3, wherein when said selected private branch radio extension terminal moves from a specific radio wave range to another radio wave range, said central processing unit determines that the radio base station units of said specific radio wave range and said other radio wave range are to transmit ringing signals to said selected private branch radio extension.

* * * * *